(12) United States Patent
Daum

(10) Patent No.: US 7,907,149 B1
(45) Date of Patent: Mar. 15, 2011

(54) SYSTEM AND METHOD FOR CONNECTING PEOPLE

(76) Inventor: Wolfgang Daum, Groton, MA (US)

( * ) Notice: Subject to any disclaimer, the term of this patent is extended or adjusted under 35 U.S.C. 154(b) by 1402 days.

(21) Appl. No.: 10/235,467

(22) Filed: Sep. 5, 2002

Related U.S. Application Data

(60) Provisional application No. 60/324,027, filed on Sep. 24, 2001.

(51) Int. Cl.
*G09G 5/00* (2006.01)

(52) U.S. Cl. ............. 345/619; 705/1.1; 705/50; 705/51; 705/52; 705/53; 705/54; 705/55; 705/56; 705/57; 705/58; 705/59; 705/70; 705/71; 705/72; 705/73; 705/74; 705/75; 705/76; 705/77; 705/78; 705/79

(58) Field of Classification Search .................. 345/619; 705/1, 50–79
See application file for complete search history.

(56) References Cited

U.S. PATENT DOCUMENTS

| | | | | |
|---|---|---|---|---|
| 5,754,938 | A * | 5/1998 | Herz et al. ..................... | 725/116 |
| 5,884,272 | A * | 3/1999 | Walker et al. ..................... | 705/1 |
| 5,911,129 | A * | 6/1999 | Towell ....................... | 704/270.1 |
| 5,957,458 | A * | 9/1999 | Haas et al. ..................... | 273/269 |
| 6,052,122 | A * | 4/2000 | Sutcliffe et al. ............... | 715/751 |
| 6,254,007 | B1 * | 7/2001 | Mowry, Jr. .................... | 235/494 |
| 6,342,906 | B1 * | 1/2002 | Kumar et al. .................. | 715/751 |
| 6,394,358 | B1 * | 5/2002 | Thaxton et al. ............... | 235/494 |
| 6,406,062 | B1 * | 6/2002 | Brooks et al. .................. | 283/92 |
| 6,411,724 | B1 * | 6/2002 | Vaithilingam et al. ........ | 382/100 |
| 6,460,036 | B1 * | 10/2002 | Herz ............................... | 707/10 |
| 6,480,885 | B1 * | 11/2002 | Olivier ........................... | 709/207 |
| 6,618,593 | B1 * | 9/2003 | Drutman et al. ............ | 455/456.3 |
| 6,662,194 | B1 * | 12/2003 | Joao ............................ | 707/104.1 |
| 6,665,389 | B1 * | 12/2003 | Haste, III ...................... | 379/196 |
| 6,735,568 | B1 * | 5/2004 | Buckwalter et al. .............. | 705/1 |
| 6,826,541 | B1 * | 11/2004 | Johnston et al. ............ | 705/36 R |
| 7,010,570 | B1 * | 3/2006 | Boies et al. ................... | 709/205 |
| 7,055,103 | B2 * | 5/2006 | Lif ................................. | 715/764 |
| 7,080,071 | B2 * | 7/2006 | Henrion et al. ................... | 707/6 |
| 7,085,806 | B1 * | 8/2006 | Shapira .......................... | 709/203 |
| 7,289,971 | B1 * | 10/2007 | O'Neil et al. ................... | 705/44 |
| 2001/0037316 | A1 * | 11/2001 | Shiloh ............................. | 705/74 |
| 2001/0037467 | A1 * | 11/2001 | O'Toole et al. ............... | 713/201 |

(Continued)

OTHER PUBLICATIONS

The effects of filtered video on awareness and privacy Michael Boyle, Christopher Edwards, Saul Greenberg, Dec. 2000 Proceedings of the 2000 ACM conference on Computer supported cooperative work.*

(Continued)

*Primary Examiner* — Javid A Amini
(74) *Attorney, Agent, or Firm* — IP Law Services, LLC; Lucy Elandjian

(57) ABSTRACT

The present invention relates to a method for a cell phone based dating service. The method uses telecommunication in the form of phones, cell phones or email. The invention proposes a method or way to exchange the information of two people in a fast way by the Internet or telephone or cell phones, making it possible divide peoples personal information in small portions and to give out these portions step by step. In the invention proposes a system-administrator, the system, will coordinate the exchange of information between the meeting people. The invention uses a computer based partner service system in which a participant can order the system to give out its personalized information in defined modifications.

15 Claims, 15 Drawing Sheets

U.S. PATENT DOCUMENTS

| | | | | |
|---|---|---|---|---|
| 2001/0050658 A1* | 12/2001 | Adams | | 345/4 |
| 2002/0019938 A1* | 2/2002 | Aarons | | 713/168 |
| 2002/0040310 A1* | 4/2002 | Lieben et al. | | 705/7 |
| 2002/0077931 A1* | 6/2002 | Henrion et al. | | 705/26 |
| 2002/0090911 A1* | 7/2002 | Evans et al. | | 455/41 |
| 2003/0009570 A1* | 1/2003 | Moskowitz et al. | | 709/229 |
| 2003/0015866 A1* | 1/2003 | Cioffi et al. | | 283/72 |
| 2004/0111639 A1* | 6/2004 | Schwartz et al. | | 713/201 |
| 2007/0099683 A1* | 5/2007 | Panther Trice et al. | | 463/1 |

OTHER PUBLICATIONS

A fuzzy commitment scheme Ari Juels, Martin Wattenberg, Nov. 1999, Proceedings of the 6th ACM conference on Computer and communications security.*

Image-driven simplification Peter Lindstrom, Greg Turk, Jul. 2000, ACM Transactions on Graphics (TOG), vol. 19 Issue 3.*

Structural digital signature for image authentication: an incidental distortion resistant scheme Chun-Shien Lu, Hong-Yuan Mark Liao, Nov. 2000 ,Proceedings of the 2000 ACM workshops on Multimedia.*

Key management for encrypted broadcast Avishai Wool, May 2000, ACM Transactions on Information and System Security (TISSEC), vol. 3 Issue 2.*

The effect of communication modality on cooperation in online environments Carlos Jensen, Shelly D. Farnham, Steven M. Drucker, Peter Kollock, Apr. 2000 , Proceedings of the SIGCHI conference on Human factors in computing systems.*

Digital facial engraving Victor Ostromoukhov Jul. 1999 SIGGRAPH '99: Proceedings of the 26th annual conference on Computer graphics and interactive techniques Publisher: ACM Press/Addison-Wesley Publishing Co.*

* cited by examiner

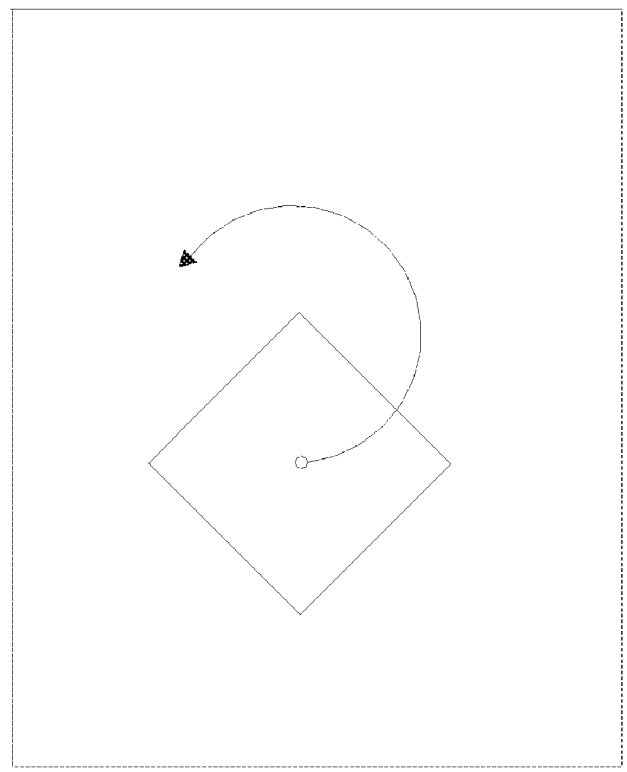
FIG. 7
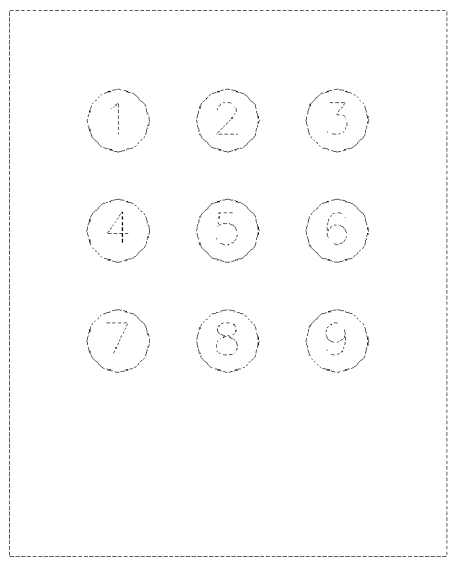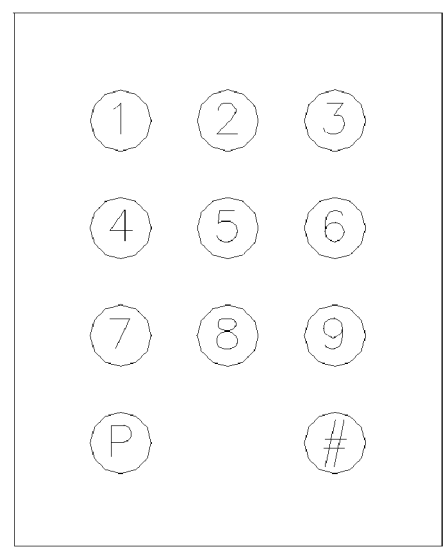
FIG. 8a                                    FIG. 8b

FIG. 16
 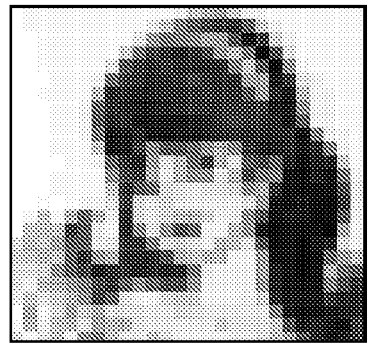
FIG. 17a          FIG. 17b

SYSTEM AND METHOD FOR CONNECTING PEOPLE

CROSS REFERENCE TO RELATED APPLICATION

This is a non-provisional application claiming the benefit of and priority to U.S. provisional patent application Ser. No. 60/324,027 filed on Sep. 24, 2001.

TECHNICAL FIELD

The present invention relates to a system and method for connecting people who are seeking a partner. The present invention utilizes telecommunication in the form of traditional phones, cellular or mobile phones, or email.

BACKGROUND

Many people in the world who want to find a partner, a friend or someone to love use partner or dating services, institutes or bureaus, or marriage services. These services connect such people. During the connection process, each person will provide information about his or her self in certain steps.

There are also many people who use marriage or partner announcements in newspapers, magazines or even the Internet. In all those cases, a person seeking a partner must provide some information of him or her self before receiving offers or answers from potential partners.

The process usually works in the following. Person A provides personal information in an announcement or to a dating service or bureau. Person B who reads and evaluates Person A's information may become interested in Person A. Person A and B get in contact either by phone, letter or the Internet. Person A and Person B eventually meet. Although person A and person B become interested in each other, the meeting of person A and person B is often the most important aspect of them getting to know and liking each other.

There are three exciting moments in the connection process. First, when a person reads the first information of the other person and decides whether to contact the other person. Second, when the two people first speak with each other, e.g., via the telephone. Third and probably the most exciting, when the two people meet and see each other.

The people who go through this process often make up their mind about the other person during the first few minutes of seeing the other person. People who have gone through this process extensively have reported that this process is rather time consuming, and they would have liked to have some video or photographs of the other person in the first information received.

The difficulty here is people only want to provide limited information about themselves to the other person due to privacy reasons. Most people are unsure about providing photographs and videos of themselves in the first disclosure. They want a trade or exchange of information in a step by step manner, e.g., I give you some of my information if you give me some of your information. Such information can be the age, size, hair color, a photograph, a video, etc. of a person.

This exchange of personal information can be accomplished in a long or time consuming process by letter (mail) or a less time consuming process via the Internet or telephones. Most people prefer a rather fast process. This is not only because they do not like a time consuming way, but because they like the excitement when the process works out in a positive way and they get to know a person they like. A faster process also allows someone to stop this "get to know each other" process quickly when the person chooses to do so.

There are different companies offering partner or dating services via the Internet or even via the telephone. However, these services or systems do not include a process where the individual person can present his or her own information in small steps, and decide if and when and the amount of information to provide or disclose to another person.

People would prefer, for example, if a photograph is provided, first to provide only the shape of their body in black and white, and then only the portion of their eyes or other single parts of their body image in the photograph. Others may prefer to provide the shape of their body in a video.

SUMMARY OF THE INVENTION

The present invention proposes to overcome the limitations of existing means for connecting people. The present invention pertains to a system and a method for exchanging the information of two people in a fast manner via the Internet or phone (phone may be a traditional telephone or a cellular or mobile phone). The present system and method involve dividing a person's personal information into small portions and providing or disclosing these portions in a step by step manner.

The system and method of the present invention involves the speeding up of one aspect of the connecting people process, wherein the parties get to know each other, by combining speech and picture/photograph/image (also moving pictures or videos) transfer. This can be accomplished via the Internet and phone. When phones are used, cell phones utilizing the standards of GPRS (General Packed Radio service) or UMTS (Universal Mobile telecommunications Systems), or others, and having a built-in camera and a display may be useful. Digital Television utilizing the standards of IDTV or others can be useful with the present invention.

The present invention also involves recording the image (still photo/image or images in a moving film/video) and voice (audio) of a person and dividing the recording into defined parts. The person who wants to provide or disclose personal information can then decide when and which part of the personal information embodied in the recording to provide or disclose.

The present invention also involves a computer based partner service system in which a participant (a person seeking to meet another person) can instruct the system to provide its personal information in defined portions or modifications to another participant. The present invention further involves a system-administrator to coordinate the exchange of information between the participants.

BRIEF DESCRIPTION OF THE DRAWINGS

The invention may be more completely understood in consideration of the following detailed description of various embodiments of the invention in connection with the accompanying drawings, in which:

FIG. 7 illustrates a frame which is set to a defined dimension circulating;

FIG. 8a illustrates a keyboard having number buttons 1-9;

FIG. 8b illustrates keyboard having number buttons 1-9, and buttons for # and P;

FIG. 16 illustrates an un-modulated image of a female; and

FIG. 17a-b illustrate examples of changing the intensity of a modulation.

DETAILED DESCRIPTION

The present invention pertains to a system and a method of connecting people. For illustration purposes, it is assumed that two people, whom we shall refer to as person A and person B, who have not met before and want to become acquainted with each other. Both people may have a G3 based cellular or mobile phone.

Figure 13:
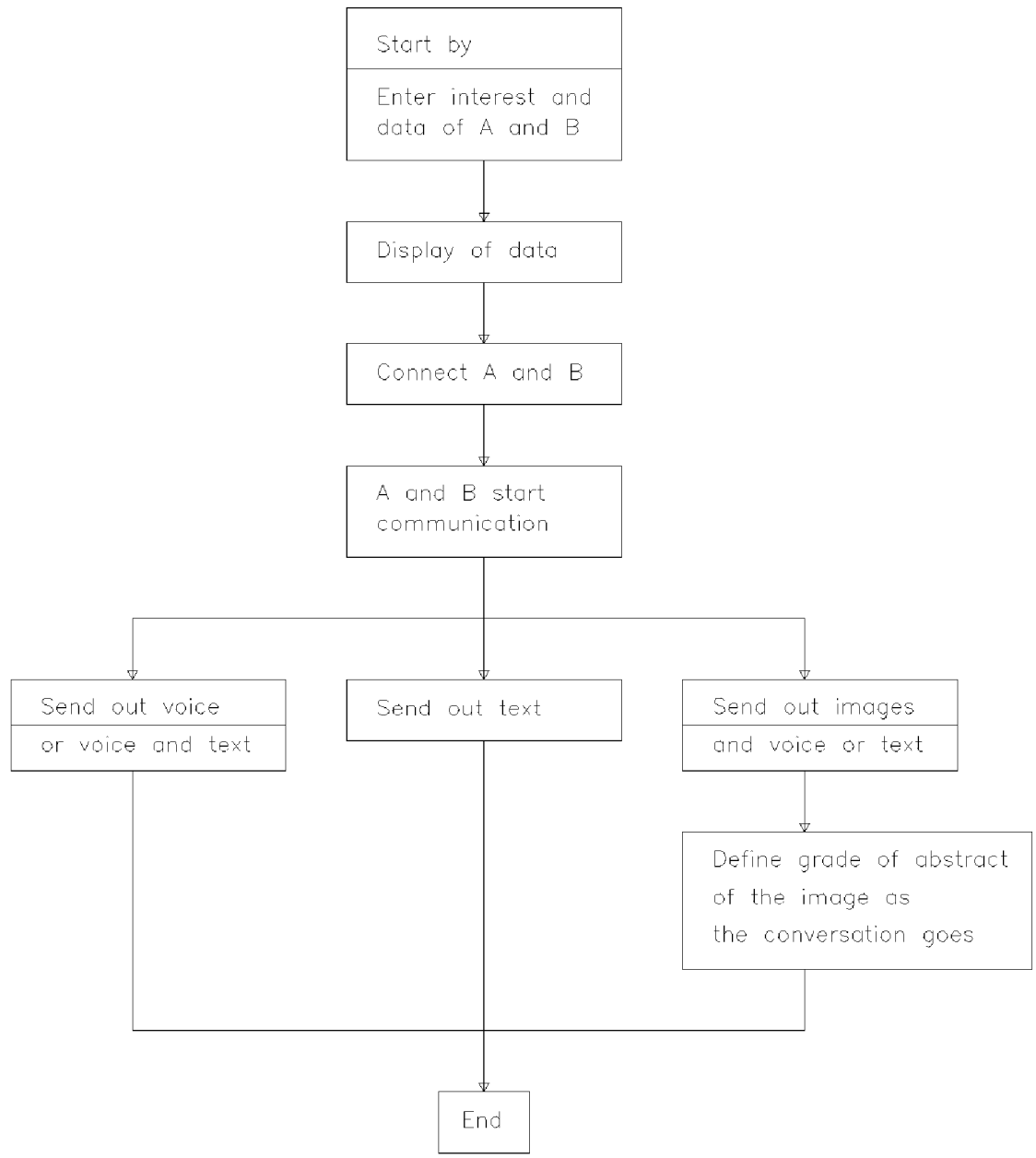
FIG. 13 illustrates an algorithm or flowchart of the system of the present invention.

The following description of the present invention refers to FIG. 13. Person A enters the system, e.g., via a cellular/mobile phone, traditional phone, or the Internet. Person A provides some information about what to show as first public and unnamed data. Person A has paid a fee, such as a subscription fee, to participate in this system and practice the method for connecting with people. Person B also enters the system via the same means. In another embodiment of the present invention, person B also pays a fee.

Then, as an initial or first step, information/data of person A is displayed to the public. This display can be made via the newspaper or magazine, the Internet (on a special www page of the system), a special channel on TV or digital TV, or a special phone display. Such deployment is made to only a select people or to the public in general. Also displayed is a code, a cipher code or box number or chiffre code with which person B can reach person A. In one embodiment of the present invention, the displayed information is open to the public; in another embodiment, the displayed information is open only to members or participants of the system who have paid a fee or to those who are specially invited.

In one embodiment of the present invention, the system collects dating offers and sorts them based on various defined features or characteristics, such as male wants to meet female, female wants to meet male, male wants to meet male, female wants to meet female or others. Sorting can be accomplished in more depth, such as color of skin, hair, etc. The system can send out a defined number of offers per time unit, e.g., a day or a week, to people in the system, who have ordered or subscribed to such a service. The system can automatically present first or initial information on the specified dates to those that have requested such dating service.

In one embodiment of the invention, time frames are displayed during which a person interested in being connected to person A can reach person A with the code. For example: person A will be available (standby) daily from 6 pm to 8 pm, and during this time frame person B dials the telephone number of the system in order to enter the system and enters the code associated with person A to be connected to person A.

In one embodiment of the invention, special phone numbers, belonging to the system, are provided for connecting directly to the person one is interested in meeting or connecting with. In such a case, the original phone number of the person one is interested in meeting or connecting with is not provided or displayed to others.

Figure 9:
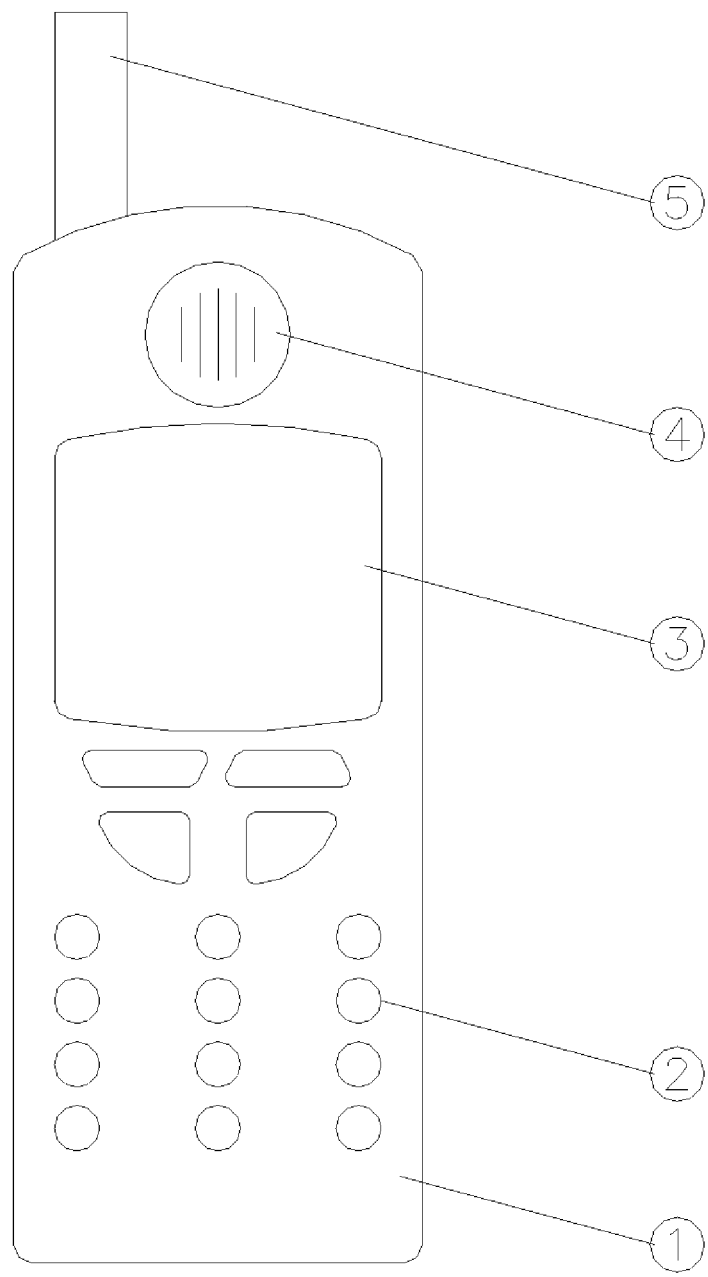
FIG. 9 illustrates a cellular or mobile phone 1 with key-field 2, display 3, camera 4 and antenna 5.
Figure 10:
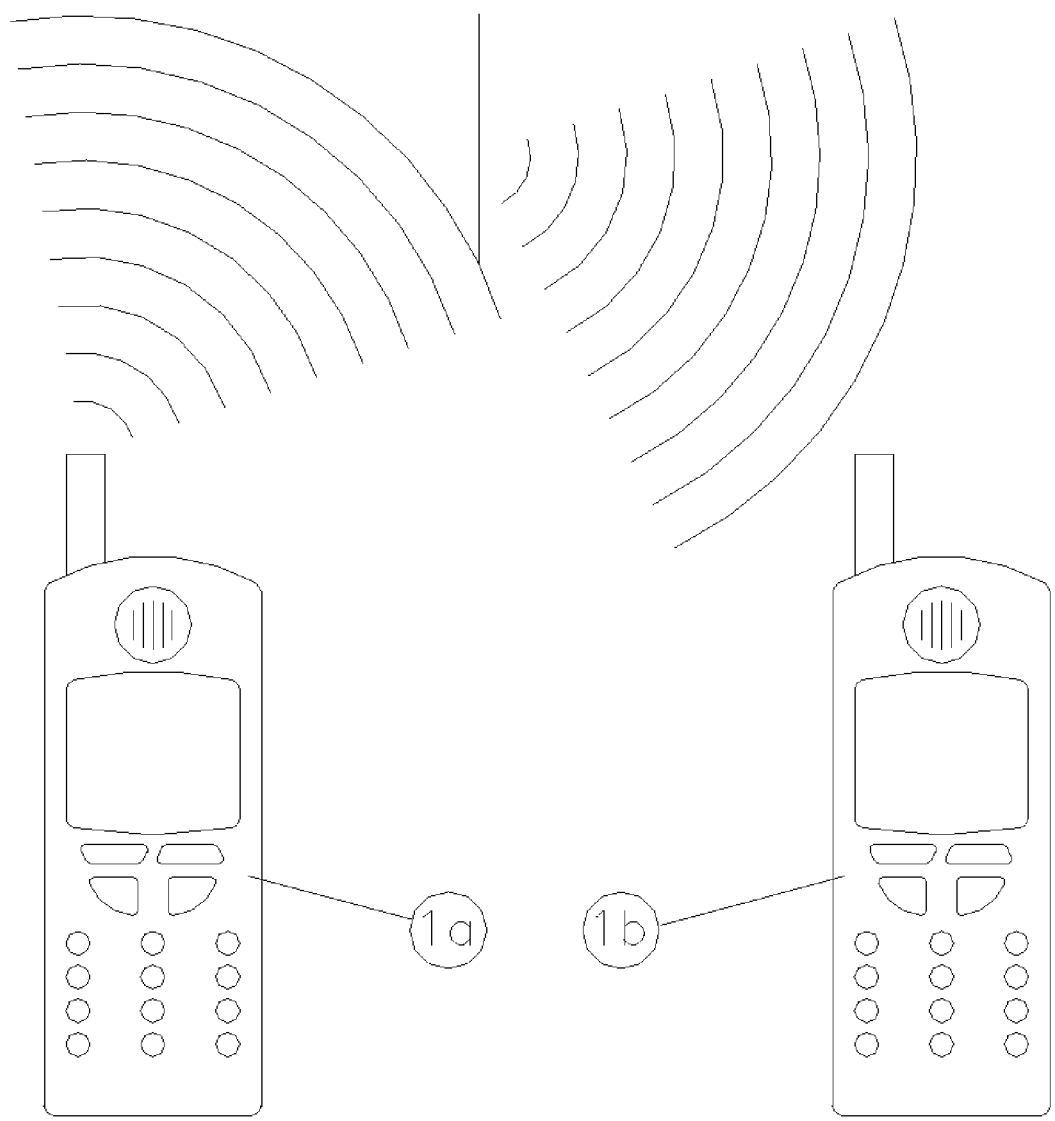
FIG. 10 illustrates communication via cellular or mobile phone 1.
Figure 11:
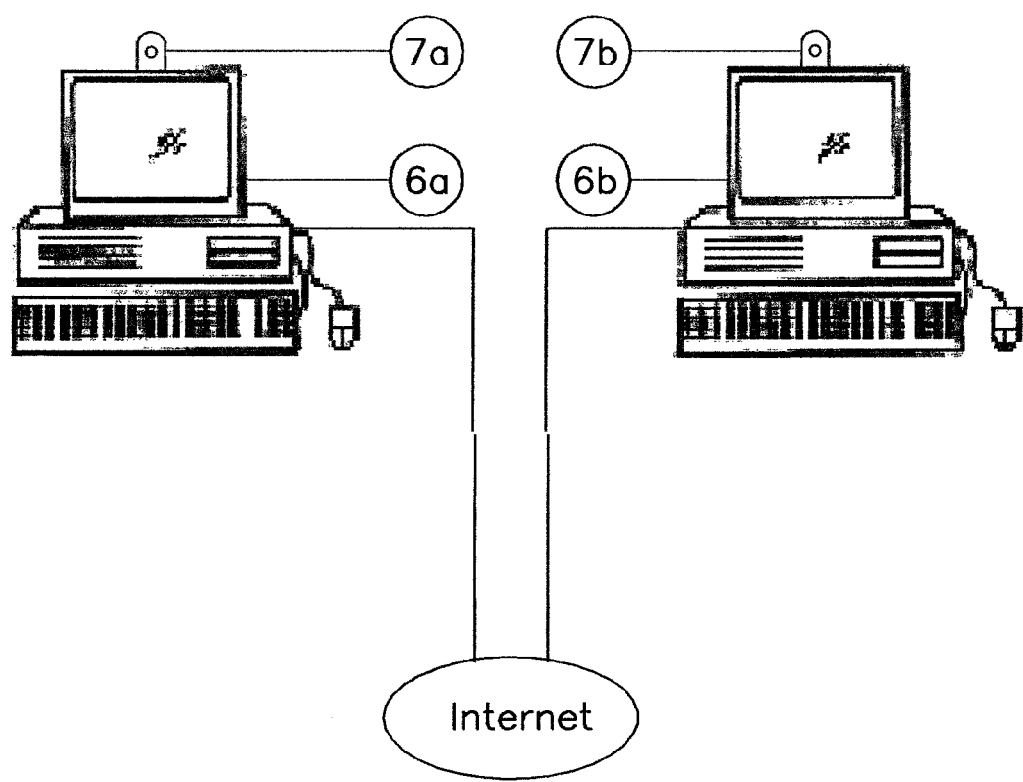
FIG. 11 illustrates communication via computer 6 equipped with camera 7.
Figure 12:
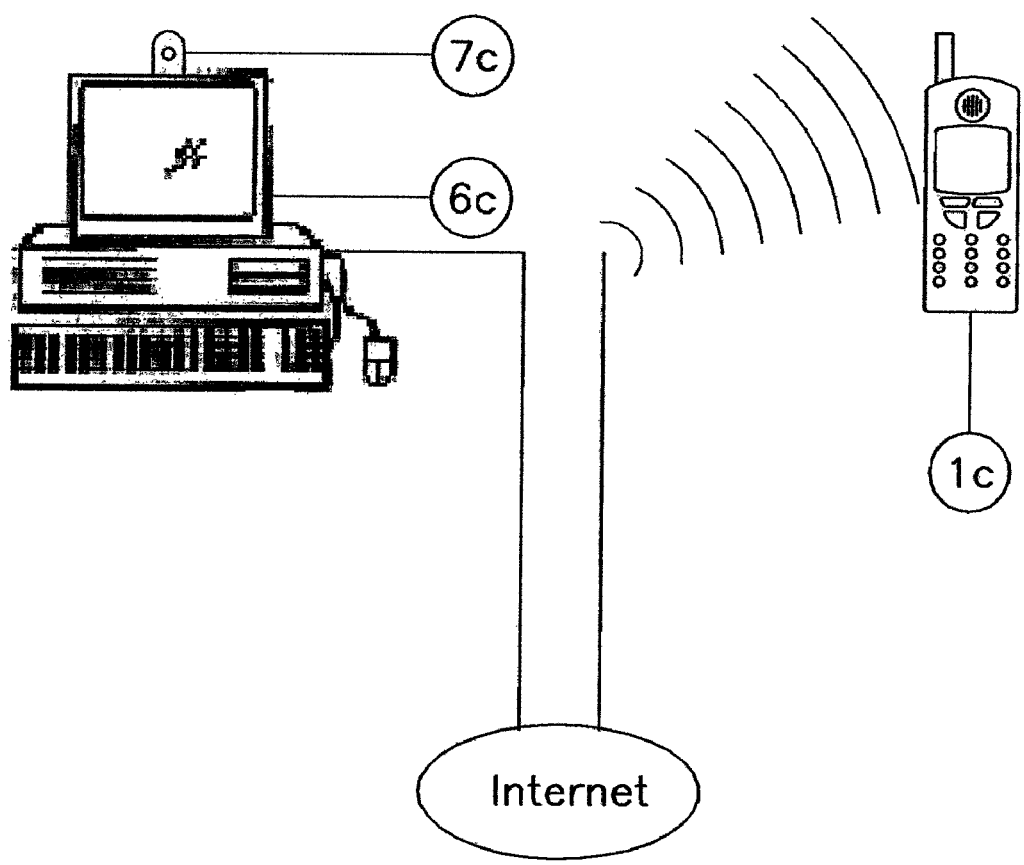
FIG. 12 illustrates communication via computer-internet-cellular phone.

In the example discussed hereinabove, person B wants to get to know person A, and now connects to person A via a cellular or mobile phone by dialling the telephone number of the system in order to be connected to the system and then dials the displayed code of person A to be connected to person A. In another embodiment of the present invention, person A and person B utilize a traditional phone or cellular or mobile phone system, as shown in FIG. 10. In another embodiment, person A and person B connect via the Internet, utilizing their computers, as shown in FIG. 11. In another embodiment, person A may use a computer connected to the Internet and person B uses a cellular or mobile phone, as shown in FIG. 12. Other embodiments include the use of digital TV. It is obvious, that a cellular or mobile phone 1 useful herein must comprise a key-field or keypad 2, a display 3, a camera 4 and an antenna 5, as shown in FIG. 9. Also, the computers 6a, 6b and 6c, shown in FIG. 11 and FIG. 12, must comprise cameras 7a, 7b and 7c.

Once person A and person B have been connected, they want to communicate with each other. This may be accomplished via typing text into the computer and sending it out to the other person. Alternatively, this may be accomplished via voice over the cellular or mobile phone, the traditional telephone or the Internet.

Figure 1:
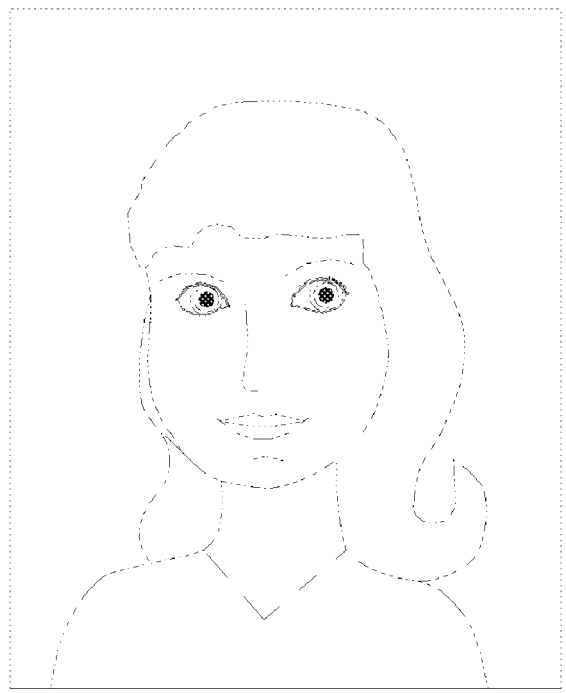
FIG. 1 illustrates an image of a person, moving or still (non-moving)

Once person A and person B have started their communication, they want to provide or disclose more and more information about themselves to the other person in small, defined quantities. They also want to see each other, and want to know how the other person moves and acts. This can be accomplished by each person providing or sending portions of their image. Person A utilizes the cellular or mobile phone, having a built-in camera, to take a photograph or a video (film) of person A. Person A now has several choices to modify the image:

Person A can send the full image (photograph or film), as shown in FIG. 1, to person B.

Figure 2:
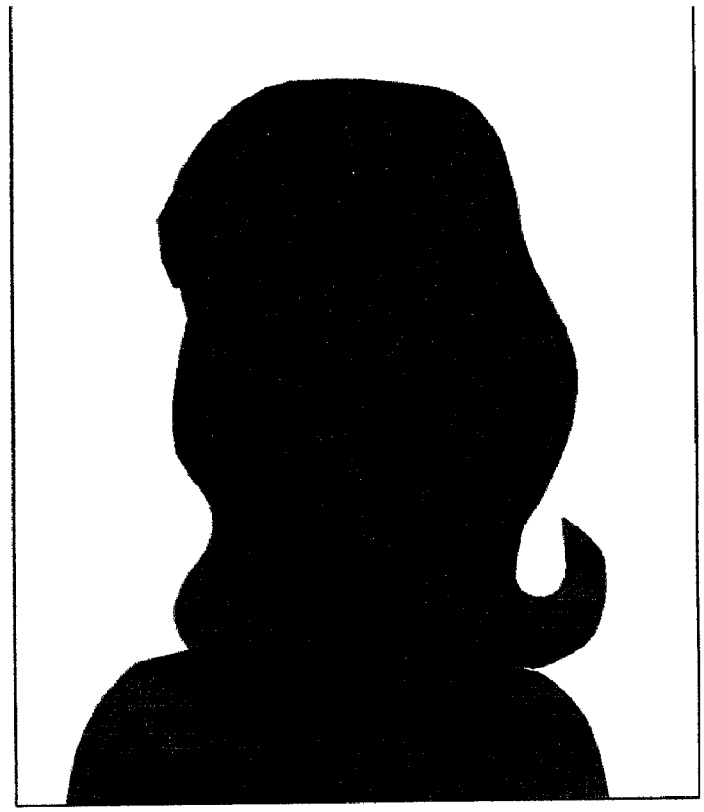
FIG. 2 illustrates a shape of the image in FIG. 1, moving or still (non-moving)

Person A can instruct the system to process or modify the image of person A on the screen of person B in such a way that only the shape of person A is seen by person B. On the screen of person B, person A is seen in e.g., black and white, such that either person A is black and the background is white, as shown in FIG. 2a, or vice versa. Other color combinations can be selected, e.g., yellow and green, blue and green, etc. Person B can provide his or her own image in the same way to person A. As the communication continues between person A and person B, person A may want to instruct the system to light up his or her own image. By pressing a defined button on the keypad or keyboard, the black image of person A lights up and person B can view more clearly the un-modified image of person A. This way, person A does not have to present itself in one shot, but provide his or her information rather slowly to person B. Either person A or person B can end the process any time.

Figure 3A:
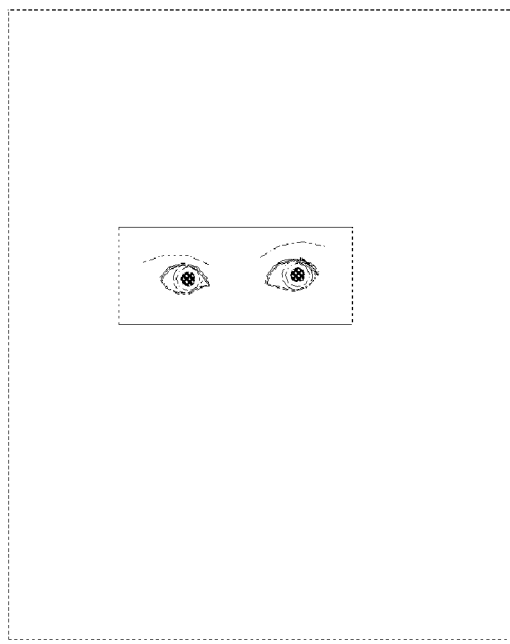
FIG. 3a illustrates the eye portion of the image in FIG. 1, moving or still (non-moving)
Figure 3B:
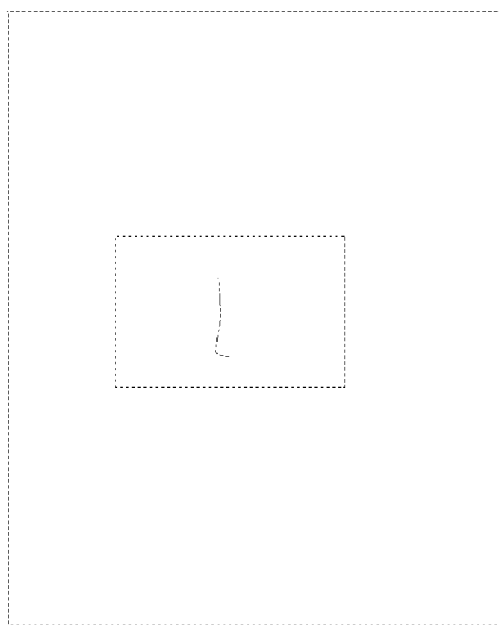
FIG. 3b illustrates the nose portion of the image in FIG. 1, moving or still (non-moving)
Figure 3C:
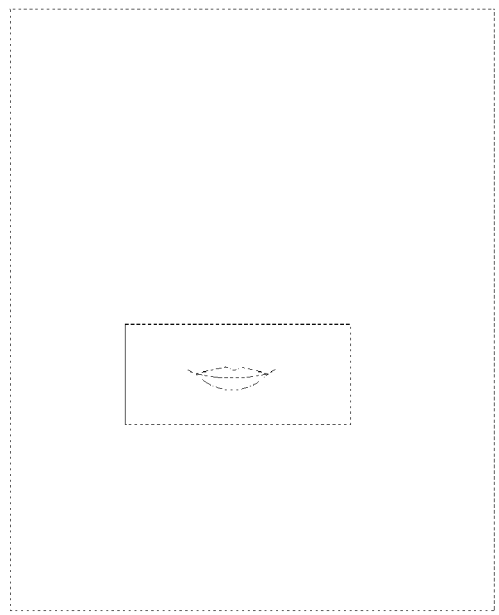
FIG. 3c illustrates the mouth portion of the image in FIG. 1, moving or still (non-moving)

Person A can instruct the system to process the image of person A on the screen of person B in such a way that only the portion of his or her eyes, as shown in FIG. 3a, his or her nose, as shown in FIG. 3b, his or her mouth, as shown in FIG. 3c, or any other body part of person A that can be seen on person B's screen. Person B can do the same to his or her image that is seen by person A.

Figure 4A:
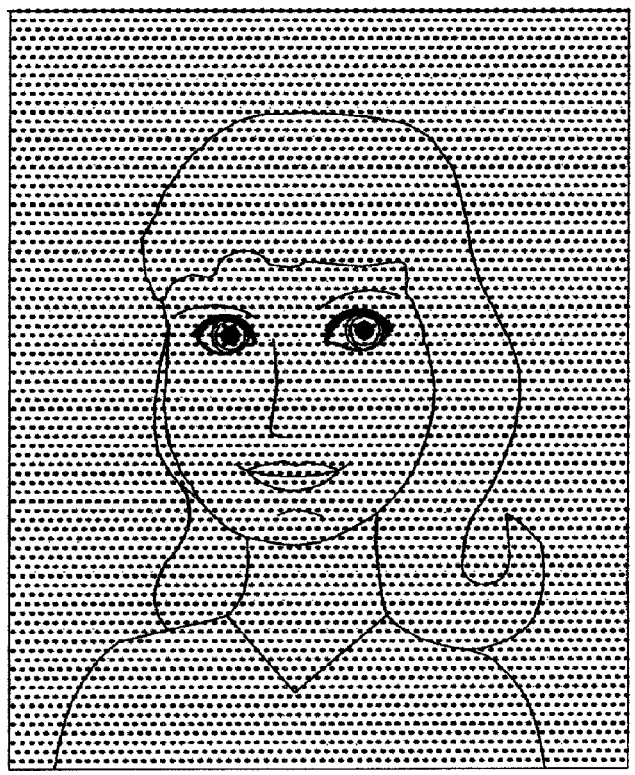
FIG. 4a illustrates image in FIG. 1, with random-noise-pattern overlaid, moving or still (non-moving)
Figure 4B:
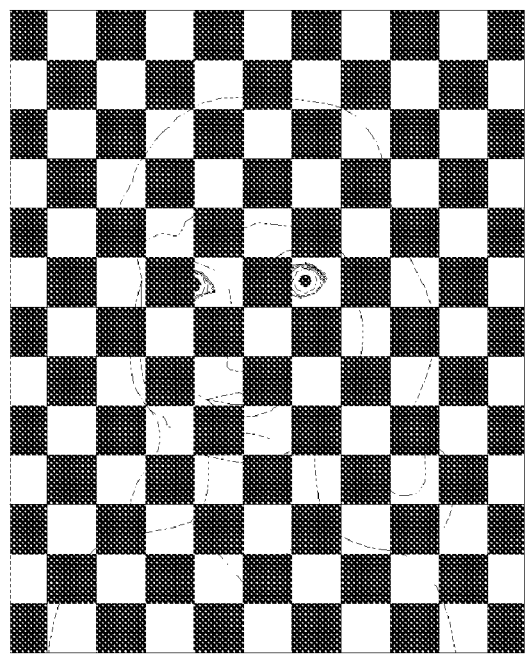
FIG. 4b illustrates image in FIG. 1, with rectangular-pattern overlaid, moving or still (non-moving)

Person A can instruct the system to process or modify the image of person A on the screen of person B in such a way that a noise signal is added to the image signal of person A, making the image of person A unclear on the screen of person B, as shown in FIG. 4a. By pushing a defined button on the keypad, person A can manipulate the amplitude or frequency of the noise function added to the image. Other signal patterns can be added to the image. For example, a square, chess-game like pattern, as shown in FIG. 4b, is added to the image. Person B can do the same to his or her image that is seen by person A.

Figure 5A:
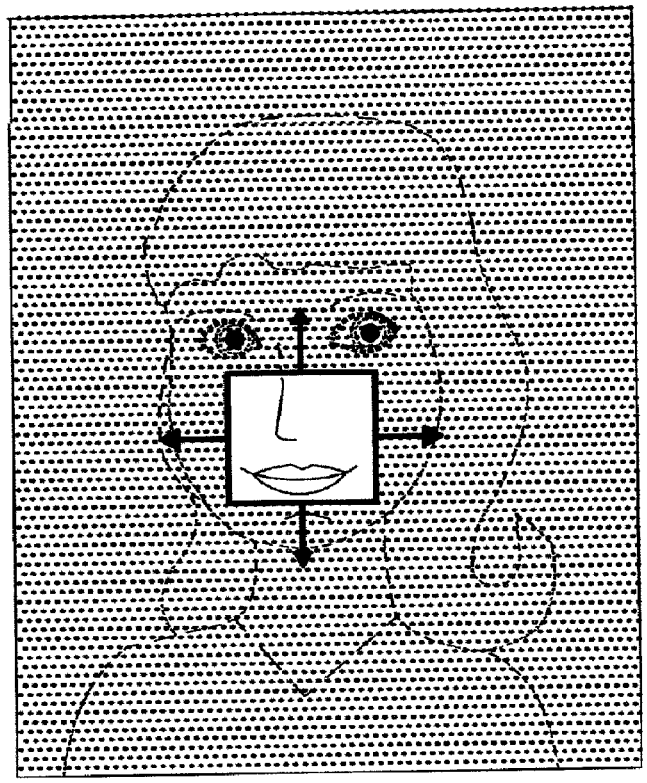
FIG. 5a illustrates a variable frame, close frame.
Figure 5B:
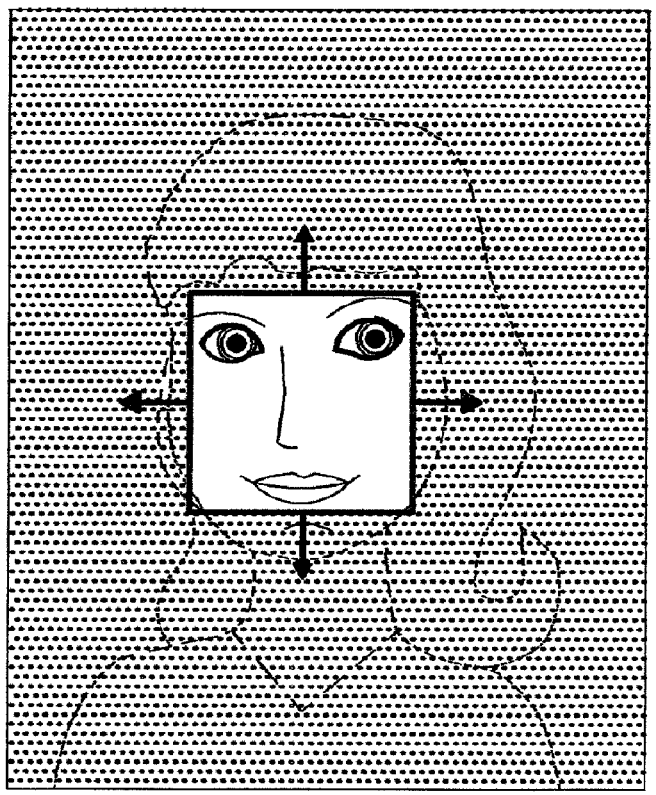
FIG. 5b illustrates a variable frame, large frame.

Person A can instruct the system to process the image of person A on the screen of person B in such a way that the image is divided into an inner and an outer portion, whereas the inner portion is seen by person B and the outer is shown as a colored frame, as shown in FIG. 5a. By pressing a defined button on the keypad of person A, person A can manipulate the inner portion, which is seen by person B, to increase or decrease the size of the inner portion, or to increase or decrease the size of the frame, as shown in FIG. 5b. Hence, person A can show person B more and more of his or her own image. Person B can do the same to his or her own image that is seen by person A.

Figure 6A:
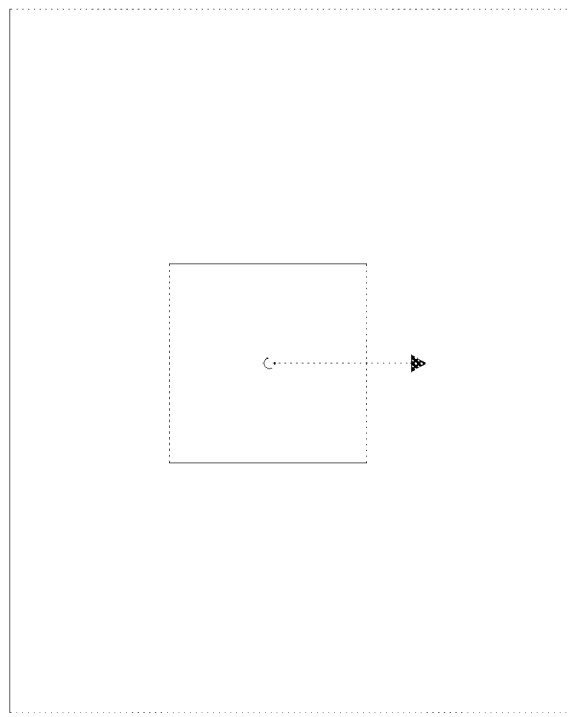
FIG. 6a illustrates a frame which is set to a defined dimension moving in x direction.
Figure 6B:
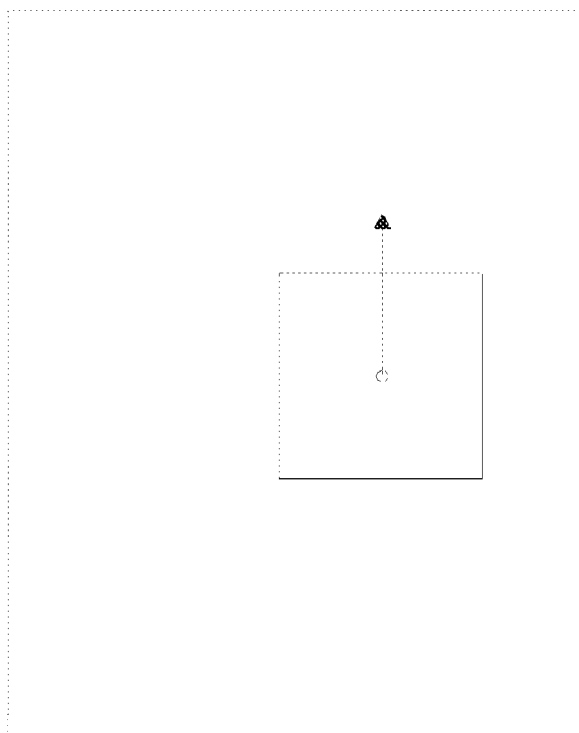
FIG. 6b illustrates a frame which is set to a defined dimension moving in y direction.

Person A can instruct the system to process the image of person A on the screen of person B in such a way that a defined frame is shown to person B, as shown in FIG. 5. With a special defined button on the keypad of the cellular or mobile phone of person A, person A can move this inner portion of the image seen by person B in the x-direction, as shown in FIG. 6a, or the y-direction, as shown in FIG. 6b. Person B can do the same to his or her own image that is seen by person A. Person A can instruct the system to process the image of person A on the screen of person B in such a way that a defined inner portion of the image of person A is shown to person B, as shown in FIG. 5. By pressing a defined button on the keypad of person A, person A can rotate the portion shown to or seen by person B on the screen of person B. By pressing the button multiple times, the rotation speed increases. Person B can do the same to his or her own image that is seen by person A.

The operation of such manipulation is accomplished via the phone keypad or the computer having a mouse and software that enables the display of buttons on the computer screen. Pressing special key-combinations on standard keypads, such as the one shown in FIG. 8a, may be interpreted by the system of the present invention to overlay a noise function on the image. There may be special keys, such as the "P" key, shown in FIG. 8b, to access certain functions.

Figure 4C:
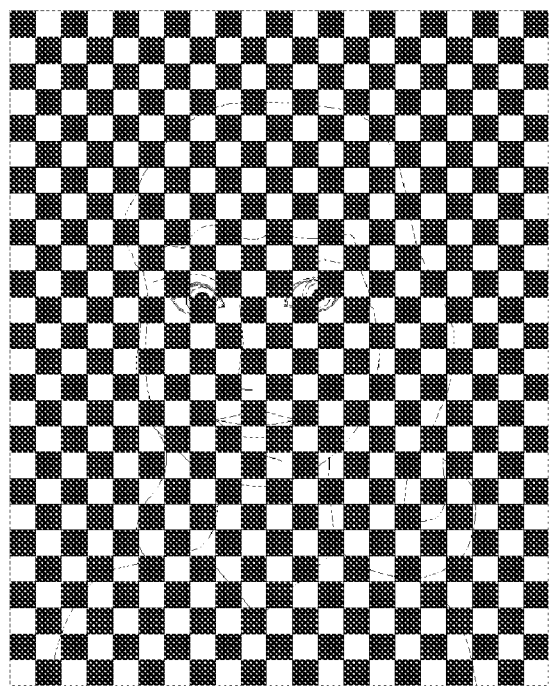

To digitally increase or decrease any form of modification as described above, a special or dedicated button or key can be pressed repeatedly. For example, pressing once would increase a defined modification, pressing a second time would double the modification, pressing a third time would triple the modification, and so on. Analog buttons can also be used in the present invention. The increase or decrease of a defined modification would then be dependent on the duration of the button being pressed. For example, as shown in FIG. 4b and FIG. 4c, pressing a button once for the chess-like modification yields a mosaic filtration of the participant's image, as shown in FIG. 4c. Pressing a button twice for the chess-like modification yields a mosaic filtration of the participant's image, as shown in FIG. 4b, hence a less modulated or a clearer image.

In addition to modifying the images of person A and person B, the voices of person A and person B can also be modified. The tone of a person's voice can be lowered or raised, or a noise or any other modifying function can be added to the voice-frequency-spectrum.

Figure 14:
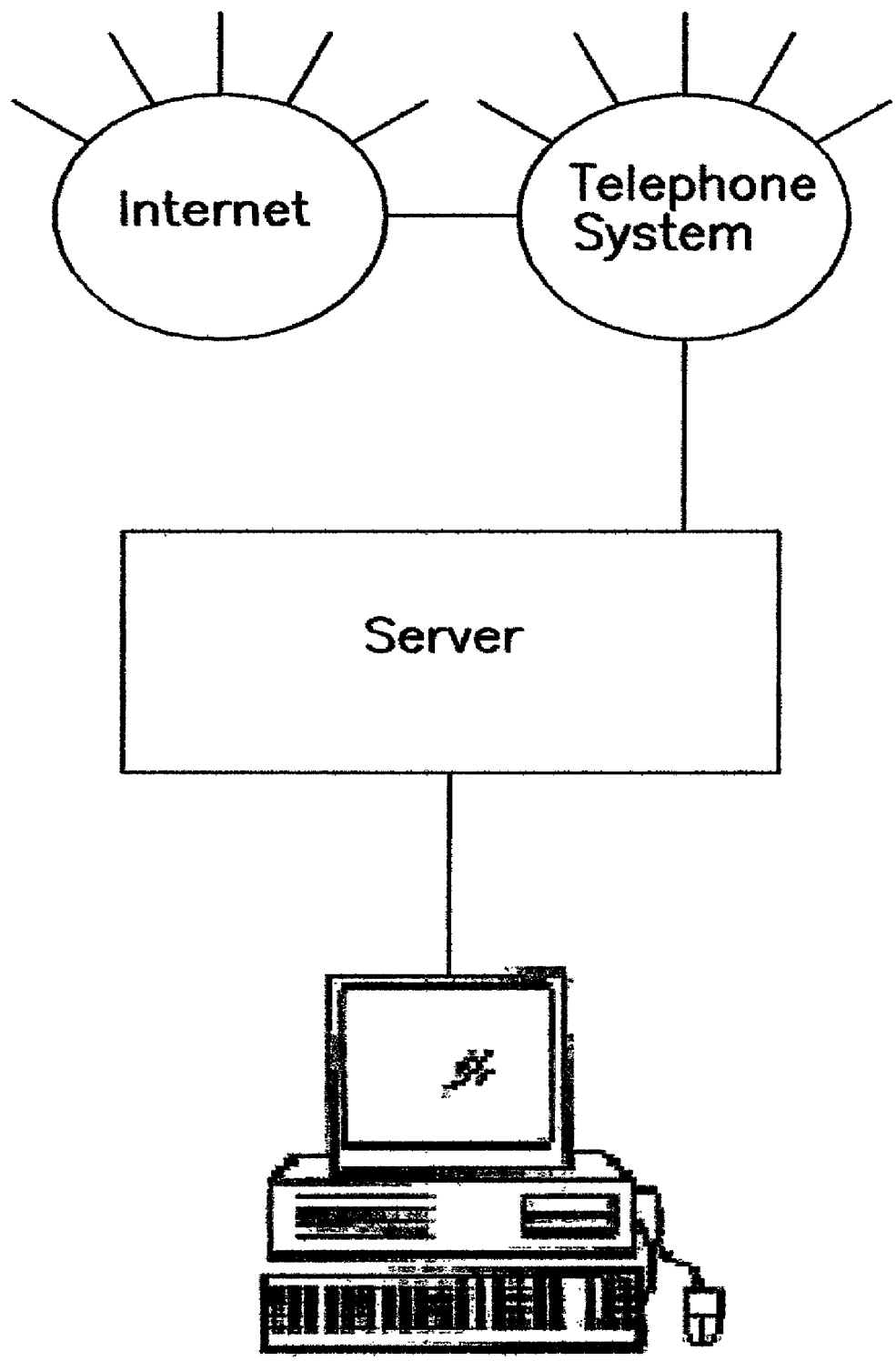
FIG. 14 illustrates a possible organization structure of the system of the present invention.

In order to facilitate the modifications of the images of the personal information of the participants (e.g., person A and person B) the system of the invention comprises a system-administrator that coordinates the exchange of information between the people and modifies the data as requested by the participants. The modifications instructed by the participants (e.g., person A and person B) are the input-parameter of the system's software which is programmed in such a way that the desired image or voice modifications are performed as instructed. The computerized system is connected to the telephone lines and the Internet, as shown in FIG. 14. The computerized system uses a server with certain software, which can modify the personalized data as requested by the person providing this data.

A participant can use the system in many ways.

Person A can have someone take a photograph of person A and send it by mail (letter or email) to the system administrator. The administrator will store the image of person A in the system. Person A can then restore or call up the image when communicating with person B and modify the image as described hereinabove. Person A can have someone to make a video (having a moving pictures/images component and a voice/audio component) of person A and send it by mail (letter or email) to the system administrator. The administrator will store the video of person A in the system. Person A can then restore or call up the video when communicating with person B and modify the video as described hereinabove.

Person A can take a photograph of his or her self while in communication with person B via the present system, and send the photograph-image via the system to person B. During this process, person A instructs the system administrator to modify the image as described hereinabove. This is an online or real-time process.

Person A can make a video (moving images) of his or her self while in communication with person B via the present system, and send the video via the system to person B. This is an online or real-time process.

Person A instructs the system administrator to modify the video as described hereinabove while person A is communicating with person B via the system, person A instructs the system administrator to modify his or her voice as described hereinabove.

The get-to-know-conversation of the participants can occur between only two participants, as described hereinabove. The get-to-know-conversation may also occur between more than just two people. Person A can also communicate with more then one person, e.g., person B, person C, person D, and so on. Person A can decide what level of image modification to provide to each participant. Hence, the modification to the image of person A that is sent to person B may be different from the modification to the image of person A that is sent to person C or person D.

In one embodiment of the present invention, the modification software is stored in the telephone or cellular/mobile phone of the participant. In this embodiment, Person A can make public one of his/her phone numbers, independent of the system administrator. When Person B calls Person A, then during the conversation Person A can perform the entire procedure from his/her own site (i.e., telephone or cellular/mobile phone) without the use of the administrator.

The following list presents the possible information routes:

| | | | | |
|---|---|---|---|---|
| cellular phone | <-> | central administrator | <-> | cellular-phone |
| cellular phone | <-> | central administrator | <-> | traditional phone |
| cellular phone | <-> | central administrator | <-> | digital TV |
| cellular phone | <-> | central administrator | <-> | computer console |
| cellular phone | <-> | cellular phone | | |
| cellular phone | <-> | traditional phone | | |
| cellular phone | <-> | digital TV | | |
| cellular phone | <-> | computer console | | |

A method which is independent of the system will be explained using the following detailed example.

A female, as shown in FIG. 16, wants to find a partner. The female has purchased the software to manipulate her image and has loaded the software into her phone. This loading can be accomplished via the Internet, direct loading into the phone in a specialized store, inserting any type of cellular phone-disc, or any other means. The purchase of the software may allow her to use the image manipulation for an unlimited time or a limited time of use or a number of times usages. In one embodiment of the present invention, the software is already included in the phone or the phone service that is purchased.

The female has published an announcement in a newspaper or magazine or even the Internet, that she is looking for a partner of a certain type. Her mobile phone allows her to have more then just one phone number. For one of her phone numbers, she has programmed her phone in such a way that it will only accept calls for this particular number between a certain timeframe during the day, for example, between 6 pm and 8 pm on the weekends. Hence, anyone calling her on this particular phone number will only be connected to the female between 6 pm and 8 pm on Saturdays and Sundays, provided that the number is not busy. This time frame was also included in the female's published announcement. For the purpose of getting to know someone, the female may have a second or third phone number connecting to her phone. She can delete such phone numbers to avoid any annoying calls. In this example, the female does not use the system to connect someone to her, rather she chooses direct connection.

On a Saturday at 6:35 pm, a male calls the female. After talking for a time and finding the male interesting, the female offers to present her image/picture/photograph to the male. Although her un-modulated image looks similar to the one shown in FIG. 16, she does not disclose her un-modulated image to the male immediately.

Figure 15A:
FIG. 15a-i illustrate examples of manipulating an image via the keyboard of a cellular or mobile phone.

The software that she had bought for this encounter allows her to use her keyboard shown in FIG. 8b. The female can use/press the 1 and P buttons to modulate the image and arrive at the image shown in FIG. 15a, wherein only the shape of the female's body is shown and it is shown in black, and to send or provide it to the male.

Figure 15B:

The female can use/press the 2 and P buttons to modulate the image and arrive at the image shown in FIG. 15b, which is the original/un-modulated image, and to send or provide it to the male.

Figure 15C:

The female can use/press the 3 and P buttons to modulate the image and arrive at the image shown in FIG. 15c, and to send or provide it to the male. It is a mosaic filtration of the image.

Figure 15D:

The female can use/press the 4 and P buttons to modulate the image and arrive at the image shown in FIG. 15d, and to send or provide it to the male. It is a punctual filtration of the image.

Figure 15E:

The female can use/press the 5 and P buttons to modulate the image and arrive at the image shown in FIG. 15e, and to send or provide it to the male. It is a water-like filtration of the image.

Figure 15F:

The female can use/press the 6 and P buttons to modulate the image and arrive at the image shown in FIG. 15f, and to send or provide it to the male. It is a wave-like filtration of the image.

Figure 15G:

The female can use/press the 7 and P buttons to modulate the image and arrive at the image shown in FIG. 15g, and to send or provide it to the male. A portion of the image is lighter.

Figure 15H:

The female can use/press the 8 and P buttons to modulate the image and arrive at the image shown in FIG. 15h, and to send or provide it to the male. Inner portion contained in the circle of image is unclear.

Figure 15I:

The female can use/press the 9 and P buttons; to modulate the image and arrive at the image shown in FIG. 15i, and to send or provide it to the male. Outer (i.e., non-center) part of image is unclear.

The female can use/press the # and P buttons to have her un-modulated image, shown in FIG. 16, sent or be provided to the male.

When the female presses the buttons 1 to 9 repeatedly, the modulation becomes more or less intense. This is shown in FIG. 16 and FIG. 17 as an example. Hence, pressing buttons "P" and "3" on the keyboard, shown in FIG. 8b, a one time yields a mosaic filtration, as shown in FIG. 17a, of the female's image shown in FIG. 16. Pushing buttons "P" and "3" on the keyboard, shown in FIG. 8b, two times yields a mosaic filtration, as shown in FIG. 17b, of the female's image shown in FIG. 16, hence a less modulated or clearer image.

During the process of sending out images of herself, the female can either see the modulated image of herself on her own phone display, or alternatively, can see the modulated image of the other participant, the one with whom she is communicating.

What is claimed is:

1. A method for connecting people, comprising:

real-time modification or filtering of personal information during a telephonic communication session between at least two persons who do not know each other prior to their first communication session, said modification or filtering of personal information being dictated by the person whose personal information is being modified or filtered;

real-time gradual releasing of said modified or filtered personal information during the telephonic communication session, said gradual releasing of personal information being dictated by the person whose personal information is being released, said modified or filtered personal information being released to at least one person of the at least two persons who are parties to the telephonic communication session, and said gradual releasing of personal information continuing until full release of said personal information or until termination of said releasing by said person or until termination of the telephonic communication;

said personal information being contained in a video comprising audio and image components, an image in a photograph, or an audio recording and released in a defined manner;

said defined manner involving the quantity of information released, the type of information released, the degree of modification or filtering of the information released, the frequency of release of the information, the audience to whom the information is released, or any combination thereof;

said method being conducted via a telephonic connection utilizing a telephonic device having a keypad and a screen capable of displaying photographs or videos;

said telephonic connection being facilitated via cellular or mobile phone service, traditional landline telephone service, voice over the Internet, IDTV, or any combination thereof, and said telephonic device being a cellular or mobile phone, a traditional landline telephone, a computer, or a digital TV, and, said method being a method for dating.

2. The method according to claim 1, said personal information being filtered to show in a photographic or video image only the shape of at least one person of the at least two persons.

3. The method according to claim 1, said personal information being filtered to show in a photographic or video image only a defined body part of at least one person of the at least two persons.

4. The method according to claim 1, said personal information being modified to lighten or darken the image in a photograph or video of at least one person of the at least two persons.

5. The method according to claim 1, said personal information being modified with a noise function overlay on the image component of the video, the audio component of the video, or both audio and video components of the video, or the image of the photograph.

6. The method according to claim 1, said personal information being modified with a pattern overlay on the image or audio component of the video, the image of the photograph, or the audio recording.

7. The method according to claim 6, said pattern being a chess-board or mosaic-like pattern.

8. The method according to claim 1, said personal information being modified to alter the clarity or the sharpness of the image in a photograph or an image component of a video.

9. The method according to claim 1, said personal information being modified to lower or raise the tone of the voice of at least one person of the at least two persons contained in an audio recording or an audio component of a video.

10. The method according to claim 1, comprising accessing of the released personal information of at least one person of the at least two persons via the use of a code or a box number.

11. The method according to claim 1, said personal information being modified or filtered via the use of a software, and the keypad of the telephonic device.

12. A system for dating to facilitate the method of claim 1, comprising:
a) a computerized central server capable of administering the telephonic connection between the at least two persons;
b) at least one telephonic device having a keypad and a screen capable of displaying photographs or videos; and
c) software to facilitate said real-time modification or filtering of personal information, said software being stored in a computer readable medium and being executable.

13. The system according to claim 12, said software being capable of storing audios, photographs or videos of a participant, modifying the audios, photographs or videos, and sending the audios, photographs or videos to at least one other person.

14. A system for dating, comprising:
a) a computerized central server capable of administering a telephonic connection between at least two persons who do not know each other prior to their first communication session, said telephonic connection being facilitated via cellular or mobile phone service, traditional landline telephone service, voice over the Internet, IDTV, or any combination thereof;
b) at least one telephonic device having a keypad and a screen capable of displaying photographs or videos, said telephonic device being a cellular or mobile phone, a traditional landline telephone, a computer, or a digital TV; and
c) software to facilitate real-time modification or filtering and gradual releasing of personal information of at least one person of the at least two persons during a telephonic communication session between the at least two persons, said software being stored in a computer readable medium and being executable, said gradual releasing of personal information being dictated by the person whose personal information is being released, said personal information being contained in a video comprising audio and image components, an image in a photograph, or an audio recording and released in a defined manner; and said defined manner involving the quantity of information released, the type of information released, the degree of modification or filtering of the information released, the frequency of release of the information, the audience to whom the information is released, or any combination thereof.

15. A method for connecting people, comprising:
real-time modification or filtering of personal information during a communication session between at least two participants;

gradual releasing of the modified or filtered personal information about at least one participant in real-time during the communication session;

said personal information being contained in a video comprising audio and image components, an image in a photograph, or an audio recording and released in a defined manner;

said defined manner involving the quantity of information released, the type of information released, the degree of modification or filtering of the information released, the frequency of release of the information, the audience to whom the information is released, or any combination thereof;

said modification being via a frame overlay on the image component of the video or the image of the photograph, said frame being moveable in x- and y-directions; and said method being conducted via a telephonic connection utilizing a telephonic device having a keypad and a screen capable of displaying photographs or videos.

* * * * *